US006937392B2

(12) United States Patent
Compton

(10) Patent No.: US 6,937,392 B2
(45) Date of Patent: Aug. 30, 2005

(54) TELESCOPE, TELESCOPE TUBE AND TELESCOPE MOUNT FOR SUPPORTING A TELESCOPE TUBE

(76) Inventor: John Compton, P.O. Box 1268, Pena Blanca, NM (US) 87041

( * ) Notice: Subject to any disclaimer, the term of this patent is extended or adjusted under 35 U.S.C. 154(b) by 27 days.

(21) Appl. No.: 10/659,336

(22) Filed: Sep. 11, 2003

(65) Prior Publication Data

US 2004/0051942 A1 Mar. 18, 2004

Related U.S. Application Data

(60) Provisional application No. 60/409,985, filed on Sep. 12, 2002.

(51) Int. Cl.[7] .............................................. G02B 23/00
(52) U.S. Cl. ........................ 359/430; 359/399; 359/429
(58) Field of Search .................................. 359/430, 399, 359/819, 822, 429, 821, 823, 826, 827; 250/203.1, 203.3, 203.4

(56) References Cited

U.S. PATENT DOCUMENTS 2,711,589 A * 6/1955 Stock ............................ 33/281
2,717,447 A * 9/1955 Leupold ....................... 42/127

* cited by examiner

Primary Examiner—Thong Nguyen
Assistant Examiner—Arnel C. Lavarias

(57) ABSTRACT

A telescope comprises a telescope tube and a mount for supporting the telescope tube for altitude and azimuth positioning. The mount comprises an azimuth assembly including vertical bearing holders in spaced parallel relation and an altitude assembly including interconnected vertical bearings rotatably supported on tracks of the bearing holders. The bearings have lips disposed over outer surfaces of the bearing holders, respectively, and a frictional adjustment mechanism of the azimuth assembly includes an extension element extendable into frictional contact with one of the lips to maintain proper tracking of the bearings on the tracks of the bearing holders. A clamp assembly disposed between the bearings comprises a plurality of clamp members having apertures, respectively, through which the telescope tube extends. The clamp members are pivotal between open and closed positions via operation of a single operating member.

6 Claims, 10 Drawing Sheets

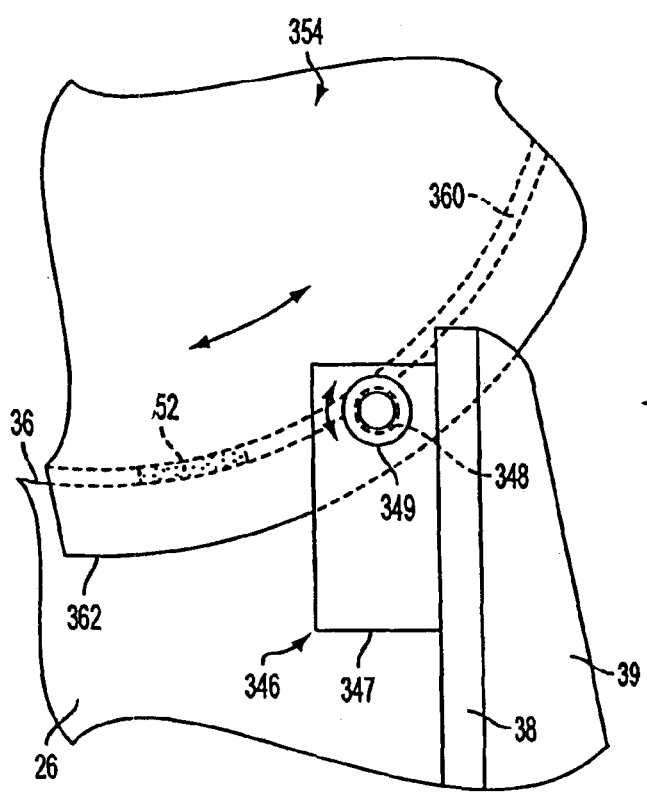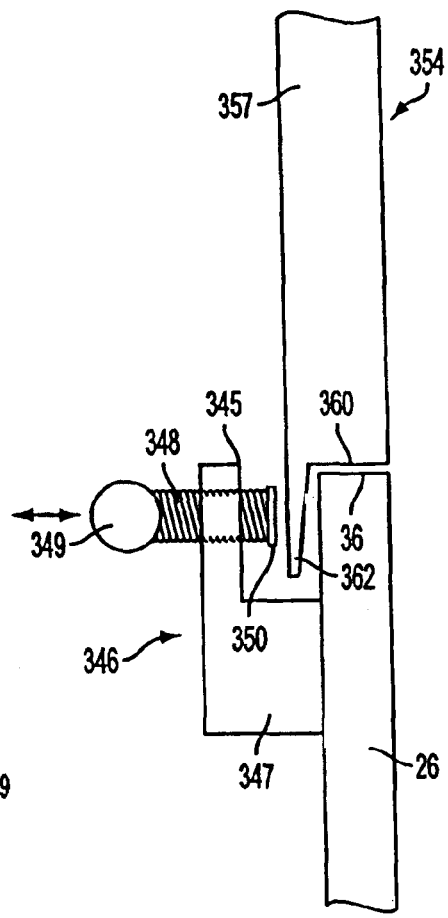
FIG. 15
FIG. 16

TELESCOPE, TELESCOPE TUBE AND TELESCOPE MOUNT FOR SUPPORTING A TELESCOPE TUBE

CROSS-REFERENCE TO RELATED PATENT APPLICATION

This application claims priority from provisional patent application Ser. No. 60/409,985 filed Sep. 12, 2002, the entire disclosure of which is incorporated herein by reference.

BACKGROUND OF THE INVENTION

1. Field of the Invention

The present invention relates generally to telescopes and, more particularly, to telescope tubes and to altitude-azimuth telescope mounts for supporting telescope tubes.

2. Brief Description of the Related Art

Telescopes generally comprise a telescope tube containing various optics for magnification and a telescope mount for supporting and positioning the telescope tube. Telescope tubes typically have an imaging end that is pointed at an object in the sky and a viewing end carrying an eye piece by which a magnified image of the object is viewed. The telescope tubes may have end rings at the imaging and viewing ends, with the end rings having an external diameter larger than the cylindrical bodies of the telescope tubes. Various materials have been proposed for the cylindrical bodies of telescope tubes including metal, plastic and cardboard. The materials conventionally used for the cylindrical bodies of telescope tubes present numerous disadvantages including difficulties associated with manufacturing, lack of durability, relatively low strength to weight ratio, lack of sufficient stiffness to hold the optics in their proper position, the inability to absorb vibrations that result in a degraded image, inadequate moisture resistance, the need for specialized coatings which add excessive weight and manufacturing complexity, relatively high specific heat resulting in an undesirable storage of thermal energy, invasion of the optical path by convection currents transferring dissipated heat with resulting degradation of image sharpness and stability, and lack of aesthetic appeal.

Wood offers several advantages over other materials more commonly used for the cylindrical bodies of telescope tubes. Wood is easier to shape, modify and repair, and is of greater durability than many materials conventionally used for the cylindrical bodies of telescope tubes. Wood has a higher strength to weight ratio than materials conventionally used for the cylindrical bodies of telescope tubes and is of sufficient stiffness to precisely hold the optics in their proper position. Wood is also excellent at absorbing minor vibrations that can be magnified into a degraded image. Normally, a telescope will cool in response to a drop in ambient temperature, such as occurs at night. Until the temperature of the telescope tube reaches equilibrium with the ambient temperature, convection currents transferring the dissipated heat from the telescope tube can invade the optical path, thereby degrading image sharpness and stability. Condensation can also cause problems in telescope tubes. Metal telescope tubes can take hours to reach equilibrium with the ambient temperature and are oftentimes coated with plastic, fiberglass or cork to impart more desirable thermal properties. Wood has a low specific heat and thusly stores minimal heat energy so that it is capable of cooling quickly to nighttime or other cooler air temperatures, such that air currents caused by heat transfer are avoided. Cardboard telescope tubes are oftentimes coated with plastic or fiberglass for increased strength and moisture resistance. The application of coatings to telescope tubes adds undesirable weight, manufacturing complexity and cost to the telescope tubes.

Wooden tube construction has been proposed comprising wooden strips attached to central support rings. Narrow width strips can be assembled to approximate a cylinder, but this requires a high level of craftsmanship and many parts. Cove and bead strips have been proposed for forming wooden tubes, but require fine finishing of both sides of each strip culminating in a very expensive finished product. Four, six or eight-sided wooden tubes are simpler and easier to make; however, the resulting tubes are not sufficiently cylindrical for smooth rotation about their longitudinal axes. Where the wooden strips are built on central support rings, the support rings are sometimes removed and discarded after the strips are laid. Accordingly, a new support ring is required for each tube to be constructed, which adds manufacturing complexity and cost. Sometimes the support rings are left in place, causing air currents along the tube to be thrown into the optical path resulting in degraded performance.

Telescopes that have altitude-azimuth telescope mounts permit a combination of vertical (altitude) and horizontal (azimuth) movements of the telescope tube to position the imaging end to find and/or track objects in the sky, which generally do not follow direct up and down (altitude) or side to side (azimuth) paths. To find and/or track objects in the sky with the imaging end of the telescope tube, altitude-azimuth telescope mounts combine vertical and horizontal movements to produce a fluidic composite movement. Many prior altitude-azimuth telescope mounts have not been successful at combining the vertical and horizontal movements to produce a composite movement that is smooth and accurate. Achieving a smooth composite motion made up of vertical and horizontal components has been so difficult to accomplish with altitude-azimuth telescope mounts that most serious astronomical viewing has been conducted using more expensive and complex equatorial telescope mounts. In addition, many prior altitude-azimuth telescope mounts do not permit fore and aft (longitudinal) adjustments and/or rotational adjustments of the telescope tube.

An altitude-azimuth telescope mount that successfully achieves fluidic altitude-azimuth motion of the telescope tube is the Dobson Telescope Mount. The Dobson Telescope Mount employs low friction bearing surfaces to address the problem of jerkiness associated with prior altitude-azimuth telescope mounts. In telescopes incorporating the Dobson Telescope Mount, a light aiming force or push on the telescope tube allows the telescope tube to be easily moved in a smooth, fluidic motion to obtain selected altitude-azimuth positioning. Upon removal of the aiming or pushing force, the telescope tube remains in and maintains the selected position. In addition, the Dobson Telescope Mount permits longitudinal and rotational adjustments of the telescope tube. In particular, the telescope tube may be balanced fore and aft, without using additional weights or springs, as eyepieces and tube-mounted accessories are changed and the telescope tube may be rotated about its central longitudinal axis for selectively positioning the eyepiece.

One significant drawback to the Dobson Telescope Mount is that the range of vertical (altitude) movement of the telescope tube is undesirably limited due to the telescope tube being obstructed by a rocker box of the Dobson Telescope Mount. In particular, a front board of the rocker box constrains vertical movement of the telescope tube to about a 90° vertical angle when pointing the imaging end at an object directly overhead. In order to follow the object beyond the range of vertical movement permitted by the Dobson Telescope Mount, the entire rocker box must be turned 180° and the direction of vertical movement for the telescope tube must be reversed in a maneuver that has become known as "the Dob Dance". Removing the front board from the rocker box to allow the telescope tube to swing past vertical has been attempted, but has proven to be untenable since the front board provides essential structural support for other components of the Dobson Telescope Mount. In particular, the front board holds the side boards of the rocker box parallel, and eliminating the front board removes almost all lateral support for the side boards. Since the side boards support the altitude bearings, the altitude bearings are susceptible to misalignment where structural support for the side boards is removed. Another disadvantage of the Dobson Telescope Mount is that tracking of the bearings to prevent azimuth wobble is not adjustable and must rely on close tolerances to function effectively. A further drawback to the Dobson Telescope Mount is that the rocker box is heavy and adds considerable weight. The Dobson Telescope usually employs a cardboard telescope tube which disadvantageously lacks durability, strength and moisture-resistance.

It is desirable for telescope tubes to be adjustable longitudinally and rotationally. The capability for longitudinal movement or adjustment of a telescope tube fore and aft along its central longitudinal axis allows balance to be achieved as different eyepieces or accessories with different weights are attached to the telescope tube. Longitudinal adjustment allows the telescope tube to be balanced without using cumbersome springs or counterweights. Rotational movement or adjustment of a telescope tube about its central longitudinal axis allows the eyepiece to be placed conveniently for the user. For economy, many manufacturers of altitude-azimuth telescope mounts mount the altitude bearings directly to the telescope tube without a clamp assembly. Where the telescope tube is mounted directly to the altitude bearings, longitudinal adjustments cannot be made and balancing either is not possible or must be done with springs and/or counterweights. Rotational adjustments are also not possible, and the lack of longitudinal and rotational adjustments presents an impediment to optimal viewing and operation.

Tube clamps generally comprise at least two clamp members for engaging the tube at two different places along its length. Increasing the distance between the clamp members generally increases the rigidity of the clamp by increasing the length of the fulcrum from the clamping points to the balance point of the tube. Most tube clamp assemblies thusly comprise two or more essentially separate, individual clamp members which are operated separately each time the clamp members are locked (closed) or unlocked (opened) with respect to the tube. Accordingly, two or more separate operating actions are required to operate the clamp assemblies, and these multiple actions are oftentimes made more difficult by the fact that the operating members for the clamp members are usually located in an awkward place at the side of the tube. Operation of conventional tube clamp assemblies is, therefore, tedious and difficult. It is particularly difficult to operate conventional tube clamp assemblies by feel, especially in the dark.

Illustrative telescope mounts are represented by U.S. Pat. No. 3,751,134 and U.S. Pat. No. 3,893,746 to McMahon, U.S. Pat. No. 3,951,511 to Parsons, U.S. Pat. No. 4,470,672 to Drauglis, U.S. Pat. No. 4,764,881 to Gagnon, U.S. Pat. No. 5,124,844 to Wraight, and U.S. Pat. No. 5,416,632 to Carlisle. The McMahon patents disclose declination bearings rotatably mounted on planar walls of a support, and a cradle mounted to the declination bearings. A telescope tube passes through the cradle, and the cradle is adjustable to assume a desired declination angle. The Gagnon patent discloses bearings rotatably supported by vertical arms carried by a rotatable horizontal platform. The Parsons patent discloses a telescope tube held by two bands at spaced locations along the length of the telescope tube. The Drauglis patent discloses friction adjusters.

In light of the above, a need exists for an altitude-azimuth telescope mount allowing altitude and azimuth movements of a telescope tube to be combined in a fluidic composite motion while ensuring proper tracking of the altitude bearings of the telescope mount to prevent slippage and wobble. There is also a need for an altitude-azimuth telescope mount in which the effort required to rotate altitude bearings of the telescope mount is adjustable. Another need exists for an altitude-azimuth telescope mount which facilitates balancing of the effort required to move the telescope tube simultaneously and smoothly in both altitude and azimuth directions. A further need exists for an altitude-azimuth telescope mount incorporating a clamp assembly for a telescope tube wherein the clamp assembly comprises a plurality of clamp members opened and closed by operating a single operating member. An additional need exists for an altitude-azimuth telescope mount incorporating a plurality of clamp members having apertures through which a telescope tube passes, wherein the clamp members are movable to selectively vary the configuration of the apertures to selectively prevent and permit longitudinal and rotational movements of the telescope tube. A further need exists for a telescope tube having a body economically and aesthetically constructed of wooden slats assembled to form a sufficiently cylindrical configuration for unimpeded rotation of the telescope tube about its central longitudinal axis.

SUMMARY OF THE INVENTION

Accordingly, it is a primary object of the present invention to overcome the aforementioned disadvantages of prior telescopes, telescope tubes and altitude-azimuth telescope mounts, particularly the Dobson Telescope Mount.

Another object of the present invention is to economically and aesthetically utilize wood as a material for the bodies of telescope tubes.

A further object of the present invention is to construct the body of a telescope tube as a plurality of wooden slats interconnected by wooden ribs to form a sufficiently cylindrical configuration for smooth rotation of the telescope tube about its central longitudinal axis.

Yet a further object of the present invention is to fabricate the body of a telescope tube from a material capable of absorbing vibrations that would otherwise be magnified into a degraded image.

An additional object of the present invention is to fabricate the body of a telescope tube from a material having a relatively low specific heat, thereby avoiding convection currents caused by heat transfer.

It is also an object of the present invention to fabricate the body of a telescope tube from a material having a relatively high strength to weight ratio.

The present invention has as another object to precisely hold optics in their proper position in a telescope tube.

Additionally, the present invention has as an object to provide an improved altitude-azimuth telescope mount which allows a telescope tube to be moved continuously past vertical while also allowing azimuth adjustments, longitudinal adjustments and rotational adjustments of the telescope tube.

Yet another object of the present invention is to adjustably clamp a telescope tube between spaced bearings of an altitude-azimuth telescope mount.

It is also an object of the present invention to effect longitudinal and rotational positioning of a telescope tube via releasable clamping engagement of the telescope tube with a plurality of clamp members operated by a single operating member.

Moreover, it is an object of the present invention to effect pivotal movement of a plurality of clamp members of a clamp assembly of a telescope mount in response to operation of a single operating member to obtain an unlocked clamp position in which the telescope tube is released for longitudinal and rotational movements and a locked clamp position in which the telescope tube is locked against rotational and longitudinal movements.

It is an additional object of the present invention to support a telescope tube within apertures of a plurality of clamp members and to selectively change the configuration of the apertures to selectively lock and unlock the telescope tube in the apertures.

The present invention has as an additional object to maintain the bearings of an altitude-azimuth telescope mount on track utilizing an adjustable lip lock.

Still a further object of the present invention is to balance the effort required to move a telescope tube simultaneously and smoothly in both altitude and azimuth directions.

Moreover, it is an object of the present invention to prevent wobble in an altitude-azimuth telescope mount.

It is also an object of the present invention to allow a telescope tube to be moved past vertical on an altitude-azimuth telescope mount, without having to reverse the direction of vertical movement of the telescope tube.

It is an additional object of the present invention to prevent slippage and maintain proper tracking of altitude bearings on altitude bearing holders in an altitude-azimuth telescope mount.

Another object of the present invention is to utilize a frictional adjustment mechanism to maintain proper tracking of altitude bearings on altitude bearing holders in an altitude-azimuth telescope mount.

Still another object of the present invention is to permit adjustment of the effort required to rotate altitude bearings on altitude bearing holders in an altitude-azimuth telescope mount.

The aforesaid objects are achieved individually and in combination, and it is not intended that the present invention be construed as requiring two or more of the objects to be combined unless expressly required by the claims attached hereto.

Some of the advantages of the present invention are that the telescope mount is intuitively easy to use; a telescope tube is provided which takes advantage of the structural, visual and thermal characteristics of wood; the telescope mount is sturdy, attractive, lightweight and easy to manufacture; the telescope mount is less expensive and easier to implement and operate than equatorial telescope mounts; the telescope mount overcomes the disadvantages of the Dobson Telescope Mount; altitude-azimuth adjustments may be accomplished in a smooth buttery motion in any direction with a light aiming or pushing force on the telescope tube; the telescope tube remains precisely and steadily positioned upon removal of the aiming or pushing force; the altitude assembly of the telescope mount precisely clamps the telescope tube between the altitude bearings; changes in weight distribution on the telescope tube, such as may result from changing eyepieces or other accessories, may be compensated for by moving the telescope tube longitudinally; the eyepiece at the viewing end of the telescope tube can be conveniently positioned by rotating the telescope tube about its central longitudinal axis; the frictional adjustment mechanism or lip lock of the telescope mount controls and adjusts both lateral twisting and vertical rotational forces of the altitude bearings on the altitude bearing holders of the telescope mount; a handle is provided at the center of gravity of the telescope; eyepiece holders of the telescope mount may be used as handles, and the centers of the eyepiece holders are located along a central balance line of the telescope mount; connecting rods of the altitude assembly are located inside axle attachment points of the clamp members so the clamp members can be moved between the locked and unlocked positions without obstruction or interference from the connecting rods; the eyepiece holder or holders is/are disposed along outer surfaces of the altitude bearing holders at a location or locations convenient for holding eyepieces and allowing the eyepieces to be easily located, especially in the dark; the altitude bearing holders are held vertical and prevented from warping; aiming or pushing forces are transmitted from the telescope tube through the clamp assembly and directly to a rotatable platform of an azimuth assembly of the telescope mount such that the telescope mount is of increased strength, stiffness and stability; the frictional adjustment mechanism or lip lock is disposed at a point which is reinforced in three directions and located a maximum distance from an azimuth rotation axis of the platform; the frictional adjustment mechanism or lip lock provides a mechanical advantage in preventing azimuth wobble otherwise caused by slippage of the altitude bearings as they transmit aiming or pushing forces to the platform; the altitude bearings rotate along a rigid track; the azimuth assembly does not require a front board to support the altitude bearing holders laterally; the telescope tube may be moved vertically from a horizontal position more than 90° in a continuous vertical movement without rotating the azimuth assembly and reversing the direction of vertical movement of the telescope tube; the azimuth assembly comprises buttresses or flanges which support the altitude bearing holders at their highest points; the azimuth assembly may be formed in part as a box structure having the eyepiece holder as its top, lower sections of the buttresses as its sides and the platform as its bottom; the frictional adjustment mechanism or lip lock is placed for maximum leverage near an outer end of the altitude bearing holder; the altitude assembly aligns and holds the telescope tube in a centered, balanced position between the altitude bearings; horizontal aiming or pushing forces on the telescope tube are transferred from the altitude bearings to the altitude bearing holders and the platform where the twisting forces are expressed as azimuth movement; vertical aiming or pushing forces on the telescope tube are expressed as rotation of the altitude bearings on the altitude bearing holders; the altitude bearings are interconnected by connecting rods arranged in a triangular configuration providing a strong, lightweight and rigid structure; two of the connecting rods are located so that they support the telescope tube when the clamp assembly is in the unlocked position; an upper connecting rod may serve as a handle; the need for springs or counterweights to achieve balance is eliminated; the telescope tube is supported by the clamp assembly at at least two locations spaced along the length of the telescope tube; the telescope tube is loosely cradled in the apertures of the clamp members in the unlocked position; movement of the clamp members increases the rigidity of the clamp assembly by increasing the distance between the points at which the telescope tube is clamped or engaged by the clamp members; the operating member for the clamp members is conveniently located; the clamp members automatically center the telescope tube when the clamp assembly is in the locked position; the clamp members are self-equalizing; non-essential portions of the altitude bearings can be removed or eliminated for lighter weight; the outer ends of the altitude bearing holders constrain the altitude bearings against fore and aft movements; the lips of the altitude bearings are constrained along their outer and inner surfaces; dust and other foreign matter are deterred by the lips of the attitude bearings from entering the bearing junction between the altitude bearings and the altitude bearing holders; the lips of the altitude bearings protect the contact surfaces of the altitude bearings when the altitude assembly is removed from the azimuth assembly; only one frictional adjustment mechanism or lip lock need be provided in the telescope mount to prevent slippage and wobble but more than one may be provided; adjusting the friction of the frictional adjustment mechanism or lip lock on the altitude bearing alters the force needed to make altitude adjustments and therefore can be used to adjust the relationship of the force needed to change altitude positions with the force needed to change azimuth positions; the frictional adjustment mechanism or lip lock may be used to lock the altitude bearings in place and prevent rotation thereof; the body of the telescope tube may be economically constructed of twelve slats interconnected by ribs; the diameter of the body of the telescope tube can be varied simply by varying the width of the slats; the slat and rib construction minimizes protrusions along the interior of the body of the telescope tube; no central support rings or bulkheads are needed, allowing the interior of the telescope tube body to be unobstructed for unobstructed airflow therethrough; the telescope tube body has a sufficiently cylindrical external configuration to allow smooth rotation of the telescope tube within the apertures of the clamp members; the ribs present protrusions along the exterior of the telescope tube body which function as hand grips to facilitate rotation; the protrusions serve as hand grips along the full length of the telescope tube body and the force required to aim the imaging end of the telescope can be applied at any point along the hand grips for easier altitude and azimuth adjustments; sliding the hands along the length of the telescope tube to vary the forces needed to aim the imaging end of the telescope tube is intuitive; and stresses on the exterior of the telescope tube body are distributed by the ribs circumferentially and longitudinally along the tube body for improved strength and stiffness while being light in weight.

These and other objects, advantages and benefits are realized with the present invention as generally characterized in a telescope mount and a telescope comprising the telescope mount and a telescope tube supported by the telescope mount for altitude and azimuth positioning. The telescope mount comprises an azimuth assembly and an altitude assembly supported on the azimuth assembly. The azimuth assembly comprises a horizontal platform rotatable about an azimuth rotation axis perpendicular to the platform and a pair of vertical bearing holders in spaced parallel relation on the platform. The azimuth assembly may also include buttresses and/or wings providing additional structural support, reinforcement and/or strength for the altitude bearing holders. The azimuth assembly may include one or more eyepiece holders which may also serve as handles. The azimuth assembly may include a base upon which the platform is rotatable and which supports the platform on a support surface. Each altitude bearing holder includes a track along an upper surface of the altitude bearing holder defining a concave configuration between forward and rearward outer ends at which the tracks are a maximum distance from the platform. Each track comprises a low friction bearing surface, which may be made of Teflon, along the upper surface of the altitude bearing holder, and each low friction bearing surface may comprise one or a plurality of low friction bearing surfaces extending along the entire or less than the entire surface area of the upper surface and defining the concave configuration. The altitude assembly comprises a pair of vertical altitude bearings interconnected in parallel spaced relation. The altitude bearings include circumferential contact surfaces respectively supported for rotation on the tracks of the altitude bearing holders, and circumferential lips extending outwardly of the contact surfaces respectively disposed over outer surfaces of the altitude bearing holders. The contact surfaces have a convex configuration complementary to the concave configuration of the tracks for rotation about an altitude rotation axis perpendicular to the azimuth rotation axis. The contact surfaces and lips may be made of Teflon, and the altitude bearings may be made of Teflon in their entireties. The azimuth assembly comprises a frictional adjustment mechanism or lip lock for altitude movement including an extension element selectively extendable into frictional contact with at least one of the lips of the altitude assembly to ensure proper tracking of the contact surfaces along the tracks. The frictional adjustment mechanism may comprise a shoulder of the azimuth assembly in spaced relation with the outer surface of one of the altitude bearing holders to define a slot between the shoulder and the outer surface of the altitude bearing holder for receiving the lip of the altitude bearing supported on the altitude bearing holder. The extension element may pass through the shoulder with an end surface of the extension element selectively extendable from the shoulder in the direction of the lip to apply the appropriate frictional force against the lip to maintain proper tracking. The shoulder may be formed in a buttress of the azimuth assembly or as a separate component attached to the azimuth assembly. The extension element may include a screw or threaded member threaded in a passage through the shoulder. The end surface of the extension element comprises a low friction surface such as felt. The extension element is located adjacent the forward or rearward outer ends of the track along which the frictionally contacted lip rides. One or more frictional adjustment mechanisms may be provided in the telescope mount. Four frictional adjustment mechanisms may be provided, one at each of the forward and rearward outer ends of each altitude bearing holder.

The present invention is also generally characterized in an altitude-azimuth telescope mount including a clamp assembly for a telescope tube, and a telescope comprising the altitude-azimuth telescope mount and a telescope tube retained by the clamp assembly. The altitude-azimuth telescope mount comprises an azimuth assembly and an altitude assembly supported on the azimuth assembly. The azimuth assembly comprises a horizontal platform rotatable about a vertical azimuth rotation axis and a pair of vertical altitude bearing holders on said platform in parallel spaced relation. The altitude assembly comprises a pair of vertical altitude bearings interconnected in spaced parallel relation with the bearings rotatably supported on the bearing holders for rotation about an altitude rotation axis perpendicular to the azimuth rotation axis. The clamp assembly is disposed between the bearings and comprises a plurality of longitudinally spaced clamp members selectively pivotal between open and closed clamp positions and an actuating mechanism having an operating member to effect pivoting of the clamp members between the open and closed clamp positions. Each clamp member has an aperture through which the telescope tube extends longitudinally. The telescope tube is movable longitudinally along its central longitudinal axis and is rotatable about its central longitudinal axis within the apertures when the clamp members are in the open clamp position. The telescope tube is prevented from moving longitudinally along its central longitudinal axis and is prevented from rotation about its central longitudinal axis within the apertures when the clamp members are in the closed clamp position. The actuating mechanism includes an actuating member interconnecting the clamp members for pivotal movement between the open and closed clamp positions in response to operation of the operating member. In a preferred embodiment, forward and rearward clamp members are provided at longitudinally spaced locations along the telescope tube. The clamp members are vertical and perpendicular to the central longitudinal axis of the telescope tube in the open clamp position with the apertures presenting a modified elliptical configuration perpendicular to the central longitudinal axis. The clamp members are non-perpendicular to the central longitudinal axis in the closed clamp position with the apertures presenting a modified circular configuration perpendicular to the central longitudinal axis. Accordingly, the apertures present a first configuration in the open clamp position and present a second configuration, different from the first configuration in the closed clamp position. In the open clamp position, the configuration presented by the apertures provides sufficient room for the telescope tube to be moved longitudinally along its central longitudinal axis as well as rotatably about its central longitudinal axis and provides sufficient room for an end ring of the telescope tube to pass therethrough. In the closed clamp position, the configuration presented by the apertures results in the telescope tube being clamped by the clamp members to prevent movement of the telescope tube longitudinally along its central longitudinal axis and rotatably about its central longitudinal axis. The clamp members pivot in opposition to one another with each clamp member pivoting about a pivot axis perpendicular to the central longitudinal axis of the telescope tube. The clamp members are pivotally connected to the bearings along the pivot axes, respectively, and pivot axles may be used to establish the pivotal connection. The bearings are interconnected to one another by a plurality of connecting rods extending perpendicularly between the bearings and including three connecting rods defining the corners of an isosceles triangle. An upper connecting rod disposed at an apex of the triangle is disposed above the telescope tube and two lower connecting rods at the base of the triangle are disposed below the telescope tube. The lower connecting rods are disposed inwardly of and between the pivot axes so as not to interfere with pivotal movement of the clamp members between the open and closed clamp positions. The actuating member includes a shaft interconnecting upper ends of the clamp members by which the upper ends of the clamp members are moved closer toward one another from the open clamp position toward the closed position and are moved further away from one another from the closed clamp position toward the open clamp position. The actuating mechanism includes a forward pivot mounted to the upper end of the forward clamp member and a rearward pivot mounted to the upper end of the rearward clamp member with the shaft connecting the pivots to effect pivotal movement of the clamp members in response to rotation of the shaft. A forward end of the shaft is threadedly engaged in the forward pivot while a rearward end of the shaft may be threadedly engaged in the rearward pivot or may be unthreaded and engaged with the rearward pivot via a turn pin. The operating member includes a handle at an end of the shaft for rotating the shaft in a first direction to pivot the clamp members from the open clamp position to the closed clamp position and for rotating the shaft in a second direction, opposite the first direction, to pivot the clamp members from the closed clamp position to the open clamp position. In the closed clamp position for the clamp assembly, the distance between lower ends of the clamp members is increased, thereby increasing the distance between the locations at which the telescope tube is supported for increased rigidity and stability. Pivotal movement of both clamp members is accomplished by operating one conveniently located operating member.

The present invention is further generally characterized in a telescope tube having an elongate body comprising wooden slats interconnected by wooden ribs, and a telescope comprising the telescope tube and a telescope mount supporting the telescope tube for altitude and azimuth positioning. The elongate body of the telescope tube comprises a plurality of elongate wooden slats and a like plurality of elongate wooden ribs interconnecting the slats to form a sufficiently cylindrical external configuration for smooth rotation of the telescope tube about its central longitudinal axis. The body is hollow, and the interior of the body contains optics for magnification. The body has an imaging end for being pointed at an object to be viewed, and a viewing end carrying an eyepiece for viewing a magnified image of the object. The body may have end rings mounted at its ends, and the end rings may be larger in external diameter than the body. Each slat is planar and has an internal surface facing the central longitudinal axis, an external surface opposite the internal surface and parallel sides connecting the external surface to the internal surface. The slats have a thickness between their external and internal surfaces and a width between their sides, with each slat having the same thickness and width. Each rib is planar and has an interior surface facing the central longitudinal axis, an exterior surface opposite the interior surface of the rib and parallel sides connecting the exterior surface of the rib to the interior surface of the rib. The sides of each rib are connected to the exterior surface of the rib at outer corners and are connected to the interior surface of the rib at inner corners. The ribs have a thickness between their exterior and interior surfaces and a width between their sides, with each rib having the same thickness and width. Each rib has slots extending along its sides with the slots extending angularly inwardly in opposite directions toward one another at the same angle from slot openings at or adjacent the inner corners, and the slot openings extend along the longitudinal sides of the rib. Each of the ribs is disposed between a pair of adjacent slats with a longitudinal side of each adjacent slat received in a corresponding slot of the rib. Since the slots extend from at or adjacent the inner corners of the ribs, protrusion of the ribs along the interior of the body is minimized. The ribs present protrusions extending longitudinally along the exterior of the body and these protrusions facilitate grasping when selectively positioning the telescope tube. The slots of each rib are preferably disposed at an angle of 15° with a plane containing the exterior surface of the rib. The planes containing the exterior surfaces of adjacent ribs intersect one another at an angle of 30°. Preferably, the body comprises twelve slats interconnected by twelve ribs for a sufficiently cylindrical external configuration. The body can thusly be constructed entirely of slats and ribs which have a simple structural shape conducive to low cost manufacture and assembly while taking advantage of the benefits presented by wood.

Other objects and advantages will become apparent from the following description of the preferred embodiments taken in conjunction with the accompanying drawings wherein like parts in each of the several figures are identified by the same or similar reference characters.

BRIEF DESCRIPTION OF THE DRAWINGS

FIG. 15 is an enlarged, broken, detailed side view showing an alternative frictional adjustment mechanism or lip lock.

FIG. 16 is an enlarged, broken, detailed front view of the alternative frictional adjustment mechanism or lip lock.

DESCRIPTION OF THE PREFERRED EMBODIMENTS

Figure 1:
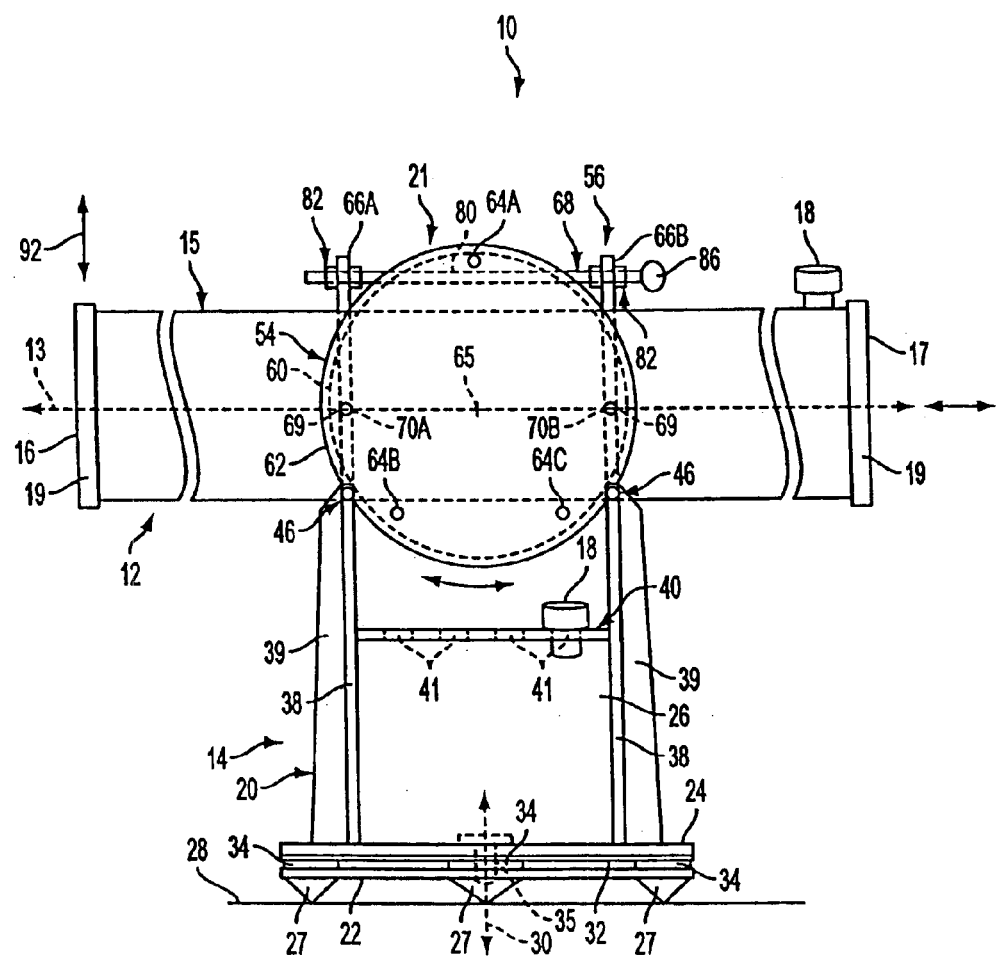
FIG. 1 is a broken side view of a telescope according to the present invention.
Figure 2:
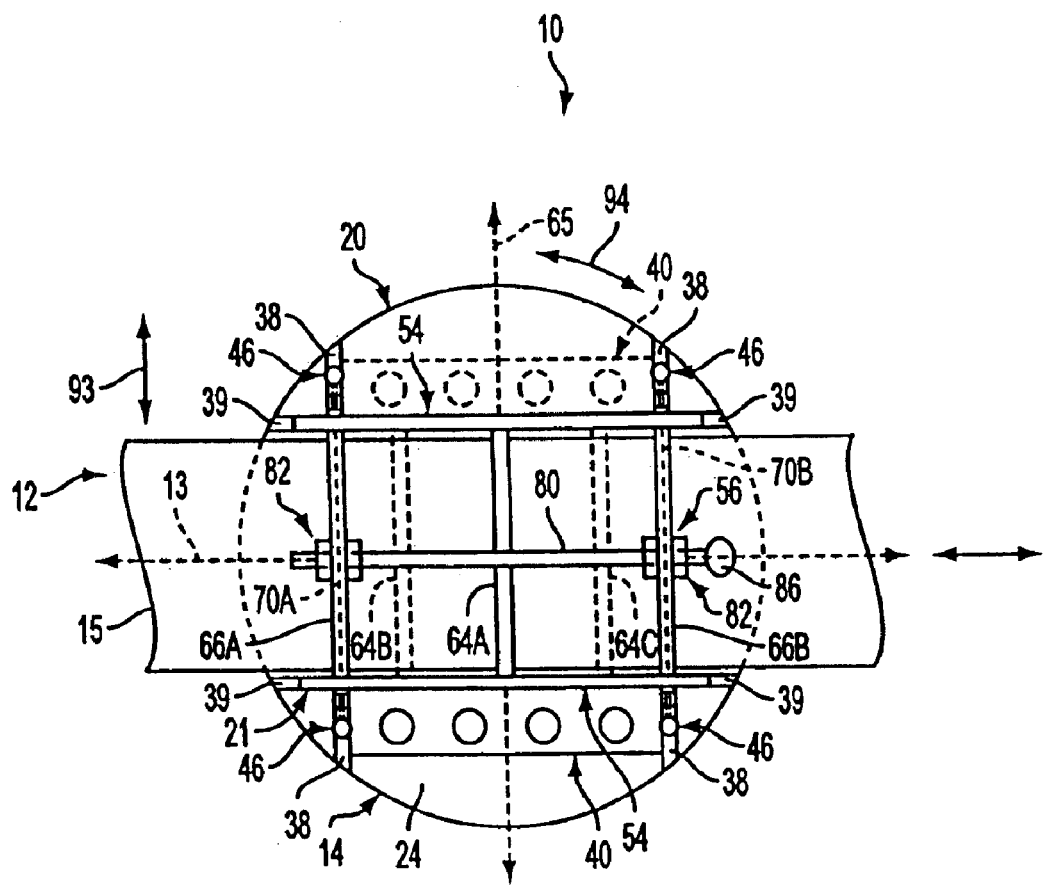
FIG. 2 is a broken top view of the telescope according to the present invention.
Figure 3:
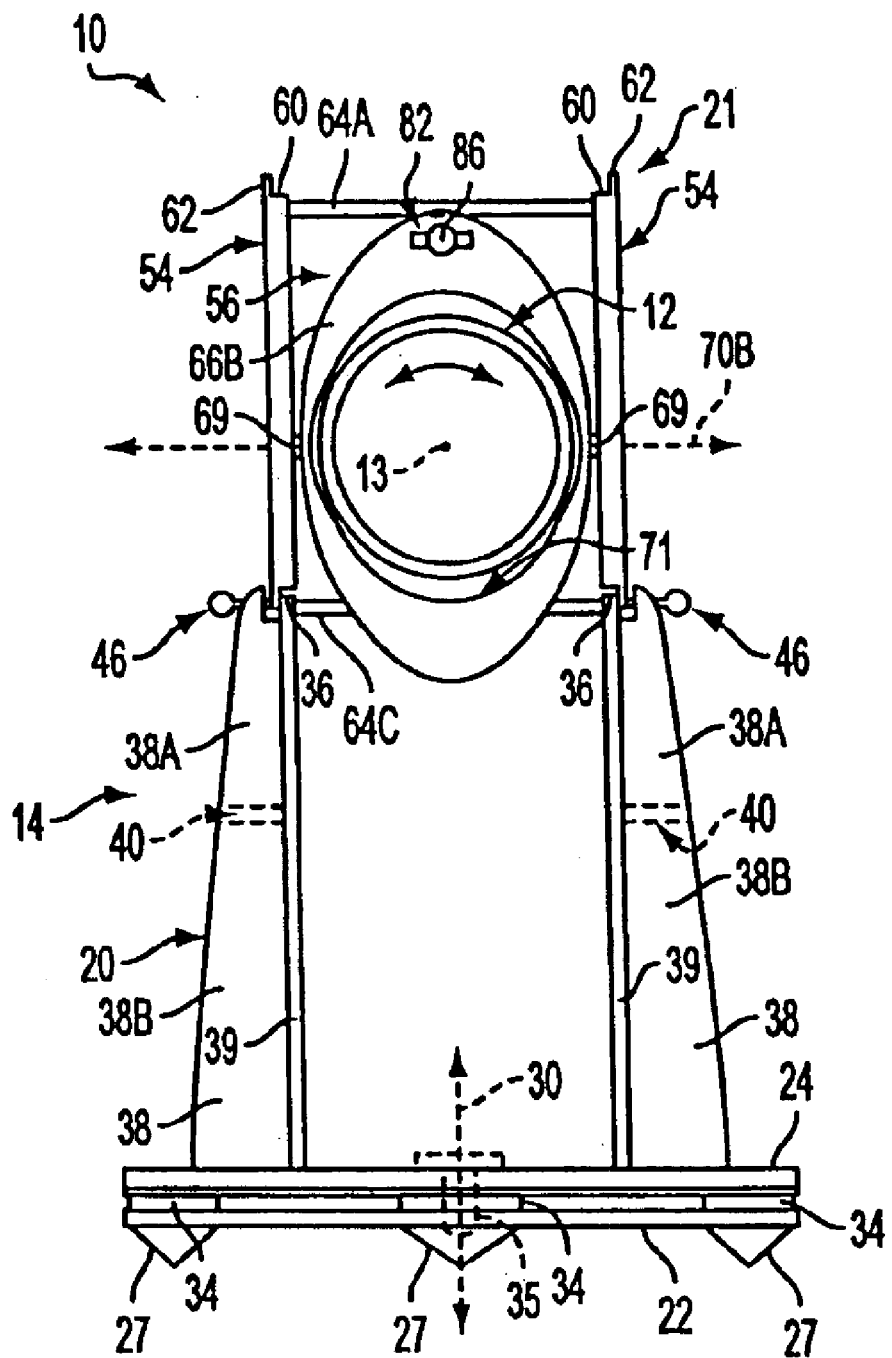
FIG. 3 is an end view of the telescope of the present invention.

A telescope 10 according to the present invention is illustrated in FIGS. 1–3 and comprises a telescope tube 12 and a telescope mount 14 for supporting the telescope tube 12. Telescope tube 12 comprises an elongate body 15 containing optics for magnification and having a central longitudinal axis 13, a forward or imaging end 16 for being pointed at an object to be viewed and having a rearward or viewing end 17 carrying an eyepiece 18 for viewing a magnified image of the object at which the imaging end 16 is pointed. The optics contained in the interior of body 15 may include lenses, mirrors and/or various other optical components providing a magnified image at eyepiece 18. The eyepiece 18 will typically be located at or near the viewing end 17 of the telescope tube opposite the imaging end 16 but may be provided at any suitable location along the length of the telescope tube. The eyepiece 18 may comprise various focusing mechanisms for focusing the magnified image viewed via the eyepiece 18. The body 15 may have an end ring 19 at its forward and/or rearward ends, and the external diameter of the end rings 19 is larger than the external diameter of the body 15. The telescope 12 may be the telescope 512 described below and depicted in FIG. 18.

The telescope mount 14 is an altitude-azimuth type telescope mount and comprises an azimuth assembly 20 and an altitude assembly 21 removably supported on the azimuth assembly 20. The azimuth assembly 20 is best illustrated in FIGS. 1–5 and comprises a base 22, a horizontal platform 24 and a pair of vertical altitude bearing holders 26 on platform 24. Base 22 is planar and has feet 27 for supporting the base in a horizontal position on any suitable support surface 28. The feet 27 can have various configurations and may support the base 22 in spaced relation to the support surface 28 as shown in FIG. 1. Any number of feet 27 can be provided at any suitable location or locations on the base 22 to support the base on the support surface in a stable, well balanced manner. The base 22 can be made of any suitable material and can have various peripheral configurations such as a circular peripheral configuration as shown for base 22. Base 22 is depicted as being of uniform thickness but could be of variable or non-uniform thickness. The feet 27 can be formed integrally unitarily or monolithically with the base 22 or as separate components attached to the base 22.

Platform 24 is mounted on base 22 for rotation relative to base 22 about an azimuth rotation axis 30 perpendicular to platform 24. Platform 24 is planar and parallel to base 22 and may have any suitable peripheral configuration the same as or different from the peripheral configuration of the base 22. The platform 24 is depicted as having a circular peripheral configuration the same as the circular peripheral configuration of base 22. The peripheral configurations of the base 22 and the platform 24 are depicted as being the same size but could be of different sizes. The platform 24 is of uniform thickness but could be of non-uniform or variable thickness. The platform 24 can be made of any suitable material and can be fabricated integrally, unitarily or monolithically as one part or may be fabricated of multiple parts or sections.

A lower surface of platform 24 comprises a bearing surface 32 which may be formed integrally, unitarily or monolithically with the platform or as a separate material applied to the platform. Accordingly, the platform 24 and the bearing surface 32 may be made of the same material or of different materials. One preferred material for the bearing surface 32 is Formica. The bearing surface 32 may comprise one continuous bearing surface or a plurality of separate bearing surfaces not connected to one another. The bearing surface 32 may cover the entire or less than the entire surface area of the lower surface of platform 24. The bearing surface 32 is depicted as a continuous bearing surface covering the entire lower surface of platform 24.

A low friction surface 34 is disposed along an upper surface of base 22 in contact with the bearing surface 32 of platform 24. The low friction surface 34 may comprise one continuous low friction surface or a plurality of separate low friction surfaces not connected to one another. The low friction surface 34 may cover the entire or less than the entire surface area of the upper surface of base 22. The low friction surface 34 is depicted as comprising a plurality of separate low friction surfaces 34 not connected to one another and covering less than the entire surface area of the upper surface of base 22. The low friction surface 34 may be formed integrally, unitarily or monolithically with the base 22 or as a separate material applied to the base 22. The base 22 and the low friction surface 34 may be made of the same material or of different materials. A preferred material for the low friction surface 34 is Teflon, and the low friction surface 34 may comprise one or more Teflon pads of suitable thickness. The bearing surface 32 and the low friction surface 34 may be made of the same material or different materials. Of course, the arrangement of bearing surface 32 and low friction surfaces 34 shown in FIGS. 1 and 3 could be reversed in that the bearing surface 32 may comprise a plurality of individual bearing surfaces not connected to one another and covering less than the entire surface area of the lower surface of platform 24 while the low friction surface 34 may comprise a single continuous low friction surface covering the entire upper surface of base 22.

A pivot element 35 connects the platform 24 to the base 22 while permitting rotation of the platform 24 relative to the base 22 about the azimuth rotation axis 30. The pivot element 35 may comprise a pivot pin axially aligned with the azimuth rotation axis 30, which is located at the centers of base 22 and platform 24. The pivot element 35 may extend entirely through the thicknesses of the base 22 and the platform 24 in a direction perpendicular to the planes of the base 22 and the platform 24. The pivot element 35 may comprise any suitable pivot structure, other than or in addition to a pivot pin, capable of mounting platform 24 for rotation relative to base 22 in a plane of the platform perpendicular to the azimuth rotation axis 30. As explained further below, rotation of the platform 24 relative to the base 22 about the azimuth rotation axis 30 is effected in response to horizontal or lateral movement of the telescope tube 12 to provide azimuth positioning for the telescope tube 12 when a horizontal or lateral aiming or pushing force is applied thereto. Contact between the bearing surface 32 and the low friction surface 34 provides sufficient friction to maintain the platform 24 stationary relative to the base 22 when no aiming or pushing force is applied to the telescope tube, while presenting minimal frictional resistance to rotation of the platform 24 relative to the base 22 when an aiming or pushing force sufficient to overcome the frictional force is applied to the telescope tube.

The altitude bearing holders 26 extend vertically upwardly from platform 24 in a perpendicular direction. The bearing holders 26 are planar and are mounted on platform 24 in spaced parallel relation to one another, with the azimuth rotation axis 30 centrally located between the bearing holders 26. Each bearing holder 26 has a concavely curving upper surface 36 extending between forward and rearward outer ends of the bearing holder. The upper surfaces 36 define the arc of a circle that is concentric with the circle defined by convexly curving contact surfaces of a pair of altitude bearings of the altitude assembly 21 as explained further below. Each bearing holder 26 may be formed integrally, unitarily or monolithically as a single part or may be formed of multiple parts or sections.

The azimuth assembly 20 may comprise various support structure for the bearing holders 26. The azimuth assembly 20 includes a pair of buttresses or flanges 38 and a pair of wings 39 for each bearing holder 26. The buttresses 38 for each bearing holder 26 extend perpendicularly from the forward and rearward outer ends of the corresponding bearing holder 26 to the peripheral edge of the platform 24. Each buttress 38 of a bearing holder 26 is contained in the same plane as a corresponding buttress 38 of the other bearing holder 26, and these planes are spaced from and parallel to one another. The buttresses 38 preferably have a tapered configuration from bottom to top as seen in FIG. 3. The buttresses 38 may be planar, and may be of any uniform or non-uniform thickness. Each buttress 38 may be made integrally, unitarily or monolithically as a single part or may be made of multiple sections or parts.

The wings 39 for each bearing holder 26 extend from the forward and rearward outer ends of the bearing holder 26 to the peripheral edge of the platform 24 in a direction coplanar with the bearing holder 26. The wings 39 are planar and perpendicular to platform 24 and buttresses 38. The wings 39 preferably have a tapered configuration from bottom to top as seen in FIG. 1. The wings 39 may be of uniform or non-uniform thickness. Each wing 39 may be made integrally, unitarily or monolithically as a single part or may be made of multiple parts.

The wings 39 may be formed integrally, unitarily or monolithically with the corresponding bearing holder 26 and/or with the corresponding buttresses 38, or the wings 39 may be formed as separate components. The buttresses 38 may be formed integrally, unitarily or monolithically with the corresponding bearing holder 26 and/or the corresponding wings 39, or the buttresses 38 may be formed as separate components. Any of the bearing holders 26, buttresses 38 or wings 39 can be formed integrally, unitarily or monolithically with the platform 24 or separately therefrom.

The azimuth assembly 20 may comprise one or more eyepiece holders 40 each comprising a shelf extending between the buttresses 38 of a bearing holder 26 along an outer surface of the bearing holder 26. The eyepiece holding 40 may be attached to the bearing holder 26 and/or buttresses 38 in various ways. The eyepiece holders 40 may be planar with opposite ends thereof attached to the buttresses 38 and a side edge thereof attached to the bearing holder 26. The eyepiece holders 40 may be perpendicular to the bearing holder 26 and buttresses 38 and may be parallel to platform 24. A plurality of holes or openings 41 are formed in the eyepiece holders 40 and are of a size to receive one or more eyepieces 18 therein in supporting relation as seen in FIG. 1. An eyepiece holder 40 may be provided on one or both bearing holders 26 as depicted in FIGS. 2 and 3. The eyepiece holders 40 may be used as handles for the telescope mount 14 by inserting the fingers in the holes 41. Each eyepiece holder 40 may be formed integrally, unitarily or monolithically with any other part of the azimuth assembly 20 or may be formed as a separate part.

In one embodiment, platform 24, bearing holders 26, buttresses 38, wings 39 and eyepiece holders 40 (if provided) are formed as separate parts assembled together. In another embodiment, each buttress 38 may be formed of separate upper and lower buttress sections 38A and 38B, shown in FIG. 3, and the lower buttress sections 38B may be assembled with the eyepiece holders 40 and with a section of a multi-part platform 24 to form a box-like structure to which the corresponding upper buttress sections 38A, bearing holder 26 and wings 39 are assembled. The azimuth assembly 20 may be designed in various ways and/or may be made of various materials providing sufficient rigidity and strength to maintain proper parallel spacing between the bearing holders 26, to support the weight of the altitude assembly 21 with the telescope tube 12 clamped therein, and to sustain the forces imparted during altitude and azimuth positioning of the telescope tube 12.

Figure 4:
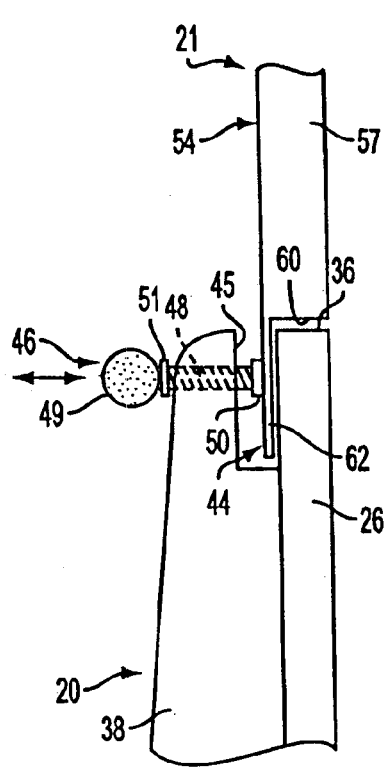
FIG. 4 is an enlarged, broken, detailed front view of an altitude-azimuth telescope mount for the telescope and particularly showing a frictional adjustment mechanism or lip lock of the telescope mount.

Each upper surface 36 of bearing holders 26 has forward and rearward outer ends at which the upper surface 36 is disposed the greatest vertical perpendicular distance or height from the platform 24. The buttresses 38 have upper ends adjacent the outer ends of the upper surfaces 36. As best shown in FIG. 4, a notch 44 is formed in the upper ends of the buttress 38, each notch 44 being open at its top and closed at its bottom by a floor. Each notch 44 defines a slot between a shoulder 45 of the buttress 38 and an outer surface of the corresponding bearing holder 26 as best shown in FIG. 4. A frictional adjustment mechanism or lip lock 46 is provided at the upper end of at least one buttress 38 and comprises an extension element 48 extending through shoulder 45 perpendicular to the outer surface of the corresponding bearing holder 26. The extension element 48 has a knob 49 at one end disposed along an outer surface of buttress 38 and a frictional end surface 50 at an opposite end disposed in the slot defined between shoulder 45 and bearing holder 26. The distance that the frictional end surface 50 extends from the shoulder 45 into the slot is adjustable. The extension element 48 may comprise a screw threadedly engaged in a passage through the shoulder 45. The distance that the frictional end surface 50 extends from shoulder 45 into the slot is adjustable by turning or rotating the screw via the knob 49 to selectively extend and retract the screw relative to the shoulder 45. A locknut 51 may be disposed on the screw between knob 49 and the outer surface of buttress 38, although a locknut may not be necessary. The frictional end surface 50 preferably comprises a felt pad on the end of the extension element. However, the frictional end surface 50 could be formed integrally, unitarily or monolithically with the extension element or separately therefrom, and may be made of the same or different material as the extension element. The azimuth assembly 20 includes at least one but may include more than one frictional adjustment mechanism 46 at the outer ends of the upper surfaces 36. FIG. 2 depicts a frictional adjustment mechanism 46 at the upper end of each buttress 38.

Figure 5:
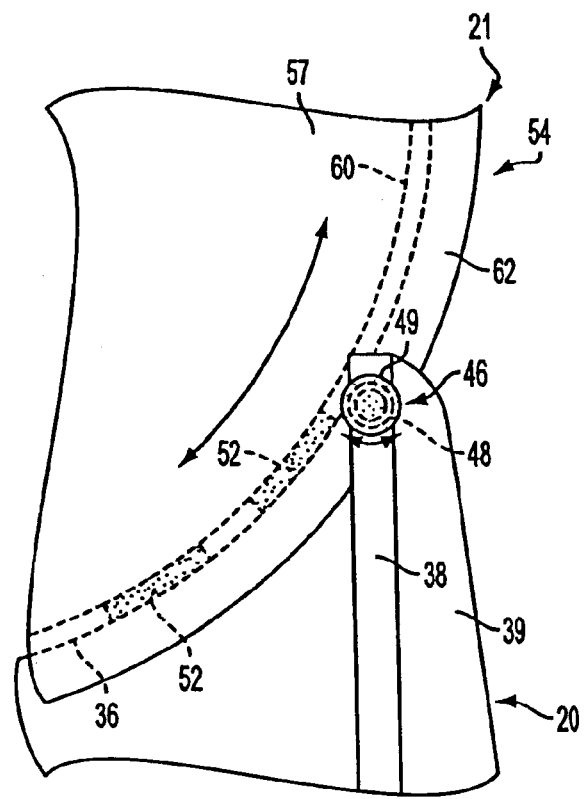
FIG. 5 is an enlarged, broken, detailed side view of the altitude-azimuth telescope mount particularly showing the frictional adjustment mechanism or lip lock.

A bearing surface 52 having low friction properties is disposed along each upper surface 36 of the bearing holders 26 as shown in FIG. 5. Each bearing surface 52 may comprise a single continuous low friction bearing surface covering the entire or less than the entire upper surface 36 or may comprise a plurality of separate low friction bearing surfaces 52 not connected to one another and covering the entire or less than the entire upper surface 36. FIG. 5 depicts the bearing surface 52 as comprising a plurality of individual low friction bearing surfaces 52 not connected to one another and spaced along the upper surface 36. In the embodiment of FIG. 5, the low friction bearing surface 52 is made of Teflon and comprises a plurality of Teflon pads. The number of and spacing for the individual bearing surfaces 52 along the upper surface 36 may vary. The low friction bearing surface 52 may be formed integrally, unitarily or monolithically with the corresponding bearing holder 26 or as a separate material disposed on the upper surface 36 of the bearing holder. The material used for bearing surface 52 may comprise various low friction materials the same as or different from the material of the upper surface of the bearing holder. The low friction bearing surface 52 follows the arcuate configuration of the upper surface 36 and defines a concavely curved track. The track defined by the bearing surface 52 defines a circle that matches or is complementary to the circle defined by the convexly curving contact surfaces of the altitude bearings as explained further below.

The altitude assembly 21 comprises a pair of vertical altitude bearings 54 rigidly connected in parallel spaced relation and a clamp assembly 56 disposed between the altitude bearings 54. The altitude bearings 54 each have a planar body 57 of circular configuration defining a circumferential contact surface 60, and a circumferential lip 62 extending outwardly from the planar body 57. The lip 62 is planar and has an outer surface coplanar with an outer surface of the planar body 57. The lip 62 is of lesser thickness than the body 57 and has an inner surface spaced inwardly of an inner surface of the planar body 57, with the contact surface 60 extending from the inner surface of the body 57 to the inner surface of the lip 62. The contact surface 60 is convexly curving and defines a circle having a circumference complementary to or matching the circumference of the circle defined by the upper surface of low friction bearing surfaces 52 of upper surfaces 36. The lips 62 have circumferential peripheral edges, respectively, concentric with the contact surfaces 60. The bearings 54 may be made of any suitable material of sufficient rigidity and strength with contact surfaces 60 preferably of Teflon. The bearings 54 can be made in their entireties of the same material as the contact surfaces 60.

The bearings 54 are rigidly interconnected by a plurality of connecting rods extending perpendicularly between the bearings. The altitude assembly 21 comprises three connecting rods 64A, 64B and 64C. Each connecting rod has opposing ends attached to the bearings 54, respectively, at attachment points on the bodies 57 of the bearings 54. The ends of the connecting rods may extend into or through the thickness of the bodies 57. The attachment points for connecting rods 64A, 64B and 64C define the corners of an isosceles triangle with an apex at the attachment point for connecting rod 64A and a base between the attachment points for rods 64B and 64C.

The bearings 54, interconnected by connecting rods 64A, 64B and 64C, are respectively supported on the bearing holders 26 with the contact surfaces 60 of the bearings disposed on the bearing surfaces or tracks 52 of the bearing holders, and the lips 62 of the bearings disposed in the slots of the azimuth assembly as best shown in FIGS. 4 and 5. Of course, the knob 49 of each frictional adjustment mechanism 46 will be rotated, as necessary, to retract the frictional end surfaces 50 in the direction of shoulders 45 an amount sufficient to allow the lips 62 to be inserted in the slots defined between the shoulders 45 and the outer surfaces of the bearing holders 26. The contact surfaces 60 of the bearings 54 are rotatably supported on the bearing surfaces 52 of the bearing holders 26 and the bearings 54 are rotatable relative to the bearing holders 26 about an altitude rotation axis 65 shown in FIGS. 1 and 2. The altitude rotation axis 65 is at the centers of the bearings 54, is perpendicular to the bearings 54, i.e., parallel to connecting rods 64A, 64B and 64C, and is perpendicular to the azimuth rotation axis 30. A bearing junction is formed between the contact surfaces 60 of the bearings 54 and the upper surfaces 36 of the bearing holders 26.

Proper tracking of the contact surfaces 60 on the bearing surfaces or tracks 52, respectively, is maintained by rotating the knob 49 of a frictional adjustment mechanism 46 in order to extend the extension element 48 thereof a sufficient distance from the corresponding shoulder 45 so that the frictional end surface 50 contacts the outer surface of the lip 62 of the corresponding bearing 54. The knob 49 is rotated until there is just enough friction between the frictional end surface 50 and the corresponding lip 62 to keep the bearings 54 from twisting off track and causing an azimuth wobble as explained further below. As pointed out above, only one frictional adjustment mechanism 46 may be necessary to maintain the contact surfaces 60 of the bearings 54 on track on the bearing surfaces 52 of the bearing holders 26 without slippage and wobble.

The clamp assembly 56 comprises a plurality of clamp members or plates 66A and 66B pivotally mounted in spaced relation between bearings 54, and an actuating mechanism 68 for selectively pivoting the clamp members 66A and 66B between open and closed clamp positions. The clamp assembly 56 includes two planar plates or clamp members 66A and 66B each having an elliptical peripheral configuration. However, the clamp assembly 56 could include more than two clamp members or plates, and the clamp members or plates may have various peripheral configurations allowing the clamp members or plates to pivot between the bearings 54 for movement between the open and closed clamp positions. Each clamp member 66A and 66B is pivotally attached to the bearings 54 by pivot axles 69 attached to the bearings 54, respectively. The axles 69 for each clamp member are coaxially aligned to define fixed clamp pivot axes 70A and 70B about which the clamp members 66A and 66B are respectively pivotal. The axles 69 can be mounted to the bearings 54 and the clamp members in many various ways permitting the clamp members 66A and 66B to pivot relative to the bearings 54 about the fixed clamp pivot axes 70A and 70B, respectively. The pivot axes 70A and 70B are parallel to the altitude rotation axis 65 while being equidistantly spaced forwardly and rearwardly of the altitude rotation axis 65. Accordingly, the clamp member 66A may be considered a forward clamp member; the pivot axis 70A for clamp member 66A may be considered a forward pivot axis; the clamp member 66B may be considered a rearward clamp member; and the pivot axis 70B for clamp member 66B may be considered a rearward pivot axis. The pivot axes 70A and 70B are perpendicular to the bearings 54. The pivot axis 70A is disposed in vertical alignment with the forward outer ends of the upper edges 36, and the pivot axis 70B is disposed in vertical alignment with the rearward outer ends of upper edges 36. Accordingly, each frictional adjustment mechanism 46 is in vertical alignment with a clamp pivot axis.

Figures 6, 7:
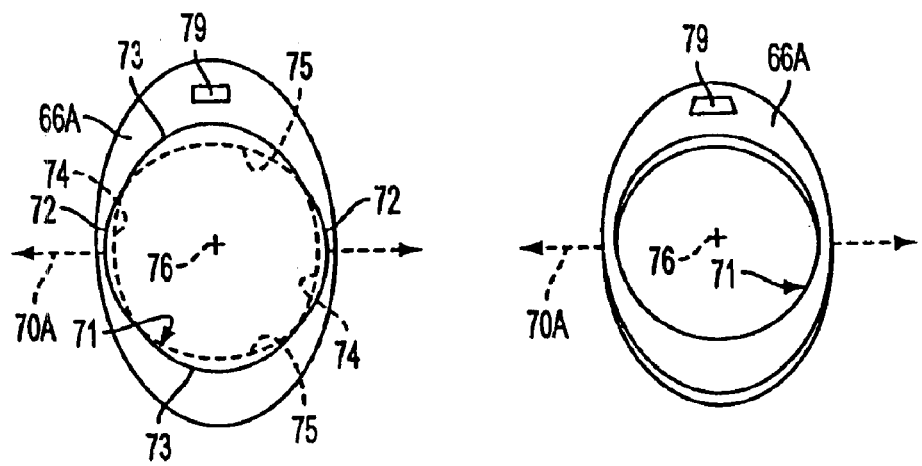
FIG. 6 is an end view of a clamp member of a clamp assembly of the telescope mount depicting the configuration of an aperture of the clamp member in an unlocked clamp position.
FIG. 7 is an end view of the clamp member depicting the configuration of the aperture with the clamp member in a locked clamp position.

As best shown in FIGS. 6 and 7 for clamp member 66A, each clamp member has an aperture 71 therein for receiving the telescope tube 12 therethrough. The aperture 71 has a modified elliptical peripheral configuration bisected by the clamp pivot axis 70A. The modified elliptical peripheral configuration of the aperture 71 is defined by opposing first arcuate peripheral segments 72 defining a minor dimension along the pivot axis 70A and opposing second arcuate peripheral segments 73 defining a major dimension perpendicular to the minor dimension. The second arcuate peripheral segments 73 define segments of an ellipse formed by second arcuate segments 73 and arcuate segments 74 shown in dotted lines in FIG. 6. This ellipse has a center along a longitudinal clamp axis 76 and a minor dimension along the pivot axis 70A equal to the external diameter of the body 15 of the telescope tube 12. The first arcuate peripheral segments 72 define segments of a circle formed by first arcuate segments 72 and arcuate segments 75 shown in dotted lines in FIG. 6. This circle has a center along clamp axis 76 and a diameter along pivot axis 70A equal to the external diameter of the end rings 19 of telescope tube 12.

Figure 8:
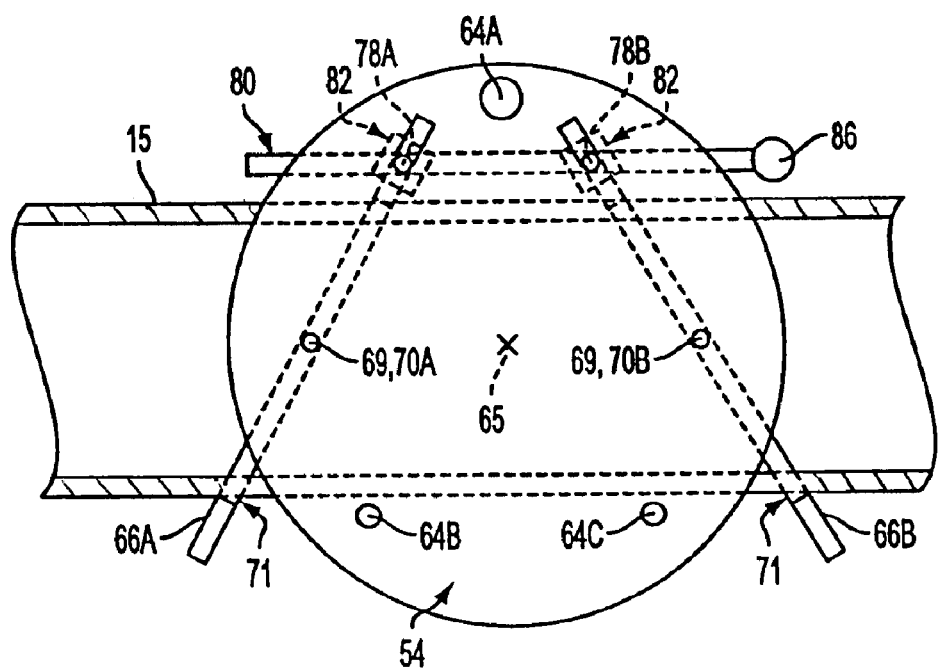
FIG. 8 is a broken side view, partly in section, illustrating the clamp assembly in the locked clamp position.

When the clamp members 66A and 66B are disposed in an open or unlocked clamp position parallel to each other and parallel to the azimuth rotation axis 30 as seen in FIGS. 1–3 and 6, the centers of apertures 71 are aligned along the longitudinal clamp axis 76, and each aperture 71 presents the modified elliptical configuration perpendicular to the clamp axis 76. The configuration presented by the apertures 71 in the open clamp position is a first configuration having a size and shape to cradle the body 15 of telescope tube 12 extending therethrough while allowing the telescope tube 12 to be moved longitudinally, i.e., forwardly and rearwardly, as well as rotatably about its central longitudinal axis within the apertures 71. Also, the apertures 71 in the open clamp position present sufficient space for the end rings 19 of the telescope tube 12 to be inserted therethrough. When the clamp members 66A and 66B are pivoted about pivot axes 70A and 70B, respectively, in opposition to one another as shown in FIGS. 7 and 8, the clamp members are in a closed or locked clamp position. Movement of the clamp members 66A and 66B from the open clamp position toward the closed clamp position involves moving the upper ends of the clamp members closer to one another while moving the lower ends of the clamp members correspondingly further away from each other. In the closed clamp position, the clamp members 66A and 66B are non-parallel to one another and are non-parallel to the azimuth rotation axis 30. In the closed clamp position, the centers of apertures 71 remain aligned along the longitudinal clamp axis 76 but the apertures 71 each present a modified circular configuration perpendicular to the clamp axis 76. The configuration presented by the apertures 71 in the closed clamp position is a second configuration, different from the first configuration, having a size and shape to forcefully clamp the body 15 of the telescope tube 12 extending therethrough to lock the telescope tube against longitudinal and rotational movements. Where the telescope tube 12 is constructed of slats and ribs as described below, the modified circular configuration of the apertures 71 in the closed clamp position will typically approximate the external diameter of the body of the telescope tube, with the body being clamped by the clamp members due to the non-circular cross-sectional configuration of the body within the apertures 71. Typically, the clamp members 66A and 66B will be rotated or pivoted about 30° from the open clamp position to a fully closed clamp position shown in FIG. 8.

Figure 9:
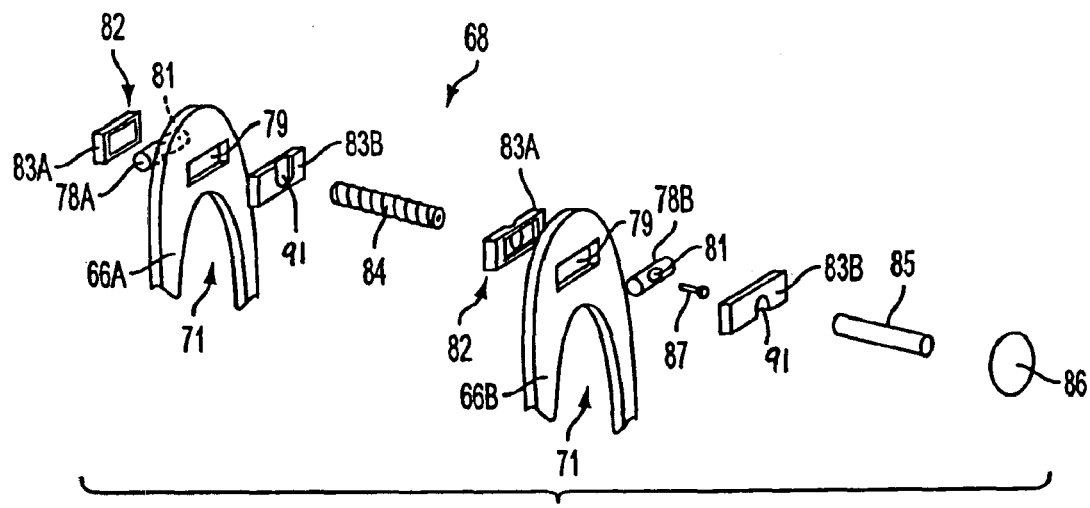
FIG. 9 is a broken, exploded perspective view of the clamp assembly.
Figure 10:
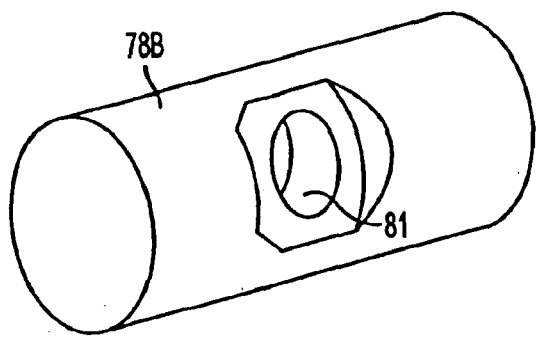
FIG. 10 is an enlarged perspective view of a pivot member of an actuating mechanism of the clamp assembly.

The actuating mechanism 68 is used to selectively move the clamp members 66A and 66B between the open and closed clamp positions to selectively vary the configuration of apertures 71 to release the telescope tube 12 for longitudinal and rotational movements or to clamp the telescope tube 12 to prevent longitudinal and rotational movements. The actuating mechanism 68 is best shown in FIGS. 1–3 and 8–12. The actuating mechanism 68 comprises forward and rearward pivots 78A and 78B disposed in slots 79, respectively, at the upper ends of forward and rearward clamp members 66A and 66B, and an actuating member 80 connecting the pivots 78A and 78B. As best shown in FIG. 10 for pivot 78B, the pivots 78A and 78B are cylindrical in configuration, each having a bore 81 therethrough perpendicular to the clamp pivot axes 70A and 70B and vertically aligned with the clamp longitudinal axis 76. Each pivot 78A and 78B is captured and rotatably held within a cover 82 attached to the corresponding clamp member 66A and 66B and formed by cover parts 83A and 83B shown in FIG. 9. The bore 81 for the forward pivot 78A is right hand threaded while the bore 81 for the rearward pivot 78B is unthreaded or smooth.

Figures 11, 12:
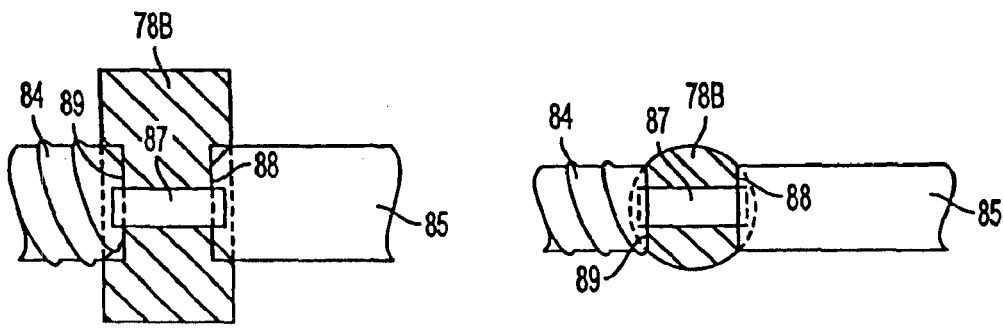
FIG. 11 is a broken top view, partly in section, of the actuating mechanism.
FIG. 12 is a broken side view, partly in section, of the actuating mechanism.

The actuating member 80 comprises an elongate shaft having an externally threaded portion 84 rotatably, threadedly received in the threaded bore 81 of forward pivot 78A and an unthreaded or smooth portion 85 connected to the threaded portion 84 and rotatably received in the unthreaded or smooth bore 81 of rearward pivot 78B. The actuating member 80 carries an operating member or handle 86 for rotating the shaft, and the operating member 86 may be carried at the end of the unthreaded portion 85. As shown in FIGS. 9, 11 and 12, the actuating member 80 may be formed of multiple parts in which the threaded portion 84 includes a turn screw and the unthreaded or smooth portion 85 includes a turn rod connected to the turn screw via a turn pin 87. The turn screw 84 has a first end threadedly received in the threaded bore 81 of the forward pivot 78A and a second end receiving a first end of turn pin 87. The turn pin 87 is of smaller diameter than the turn screw 84 and the turn rod 85 and is rotatably disposed in the unthreaded bore 81 of the rearward pivot 78B, with a second end of the turn pin 87 received in a first end of the turn rod 85. A second end of the turn rod 85 carries the operating member 86. The turn pin 87 is rotatable within the rearward pivot 78B by having a forward face of turn rod 85 pressing against a rearward face 88 of rearward pivot 78B or by having a rearward face of turn screw 84 press against a forward face 89 of the rearward pivot 78B as best shown in FIGS. 11 and 12.

As shown in FIGS. 1–3 and 8, the telescope tube 12 is supported by the telescope mount 14 by being inserted through the longitudinally aligned apertures 71 of clamp assembly 56 with the clamp members 66A and 66B in the open clamp position providing sufficient space for an end ring 19 of the telescope tube 12 to be inserted through the apertures 71. The body 15 of telescope tube 12 is loosely cradled in the apertures 71 and is supported by the clamp members 66A and 66B at two longitudinally spaced locations along the length of the telescope tube. With the clamp assembly 56 in the open or unlocked clamp position, the telescope tube 12 can be moved longitudinally, i.e., forwardly and rearwardly, along its central longitudinal axis 13 as shown by arrows in FIGS. 1 and 2. Also, the telescope tube 12 can be moved rotationally about its central longitudinal axis 13 as shown by an arrow in FIG. 3. When the telescope tube 12 is oriented with its central longitudinal axis 13 perpendicular to the azimuth rotation axis 30 as depicted in FIGS. 1–3, the connecting rod 64A is in alignment with the azimuth rotation axis 30.

To move the clamp assembly 56 from the open clamp position toward the closed or locked clamp position, the operating member 86 is rotated in a first direction to turn the threaded portion 84 into the threaded bore 81 of forward pivot 78A, thereby pulling the forward pivot 78A against its cover 82. Since the cover 82 for pivot 78A is attached to the forward clamp member 66A, the forward clamp member 66A is caused to pivot or rotate from the open clamp position toward the closed clamp position about its pivot axis 70A. The forward face of the smooth portion 85 presses on the rearward face 88 of the rearward pivot 78B, causing the rearward pivot 78B to push on its cover 82 which is attached to the rearward clamp member 66B. Accordingly, the rearward clamp member 66B is caused to pivot or rotate about the pivot axis 70B from the open clamp position toward the closed clamp position. The clamp members 66A and 66B pivot or rotate about their pivot axes 70A and 70B in opposition to one another when moved from the open clamp position toward the closed clamp position in that forward clamp member 66A pivots or rotates clockwise (looking at FIG. 8) about its pivot axis 70A while rearward clamp member 70B pivots or rotates counterclockwise about its pivot axis 66B. In most cases, the clamp members 66A and 66B will rotate or pivot in unison.

Moving the clamp members 66A and 66B from the open clamp position toward the closed clamp position changes the configuration of apertures 71 perpendicular to the central longitudinal axis 13 of the telescope tube 12 from the first configuration to the second configuration preventing longitudinal movement of telescope tube 12 along its central longitudinal axis 13 and preventing rotational movement of telescope tube 12 about its central longitudinal axis 13. The distance between the lower ends of the clamp members 66A and 66B is increased in the closed clamp position, which increases the rigidity of the clamp assembly 56 by increasing the longitudinal distance between the points where the telescope tube 12 is clamped, engaged and supported by the clamp members. The clamp assembly 56 holds the telescope tube 12 solidly in the proper position between the altitude bearings 56. When the telescope tube 12 is constructed as described below, the curved edges of apertures 71 clamp on the non-circular external cross-section of the body of telescope tube 12. The modified elliptical configuration of the apertures 71 in the open clamp position eliminates twisting which might otherwise cause the clamp members 66A and 66B to bind against the telescope tube 12.

The clamp assembly 56 is moved from the closed clamp position to the open clamp position by rotating the operating member 86 in a second direction, opposite the first direction, to unscrew the threaded portion 84 from the threaded bore 81 of the forward pivot 78A. Rotation of the threaded portion 84 in the threaded bore 81 of forward pivot 78A pushes the forward pivot 78A against its cover 82 which is attached to the forward clamp member 66A. Accordingly, the forward clamp member 66A plate 82 is caused to pivot on its pivot axis 70A from the closed clamp position toward the fully open clamp position in which the forward clamp member 66A is parallel to the azimuth rotation axis 30. The pushing force of the forward pivot 78A causes the rearward face at the end of the threaded portion 84 to press against the forward face 89 of the rearward pivot 78B, causing the rearward pivot 78B to push against its cover 82. Since the cover 82 for rearward pivot 78B is attached to the rearward clamp member 66B, the rearward clamp member 66B is caused to rotate on its pivot axis 70B from the closed clamp position toward the open clamp position in opposition to the forward clamp member 66A. In practice, the clamp members 66A and 66B need only be pivoted or rotated a few degrees from the closed clamp position toward the fully open clamp position to release the clamping force on the telescope tube 12, which will then be supported by the lower connecting rods 64B and 64C and will be adjustable longitudinally along its axis 13 and rotationally about its axis 13 with the clamp members in less than fully open clamp position. The clamp assembly 56 need only be moved to the fully open clamp position when removing the telescope tube 12 entirely from the clamp assembly 56.

The axles 69 are located outwardly of the connecting rods 64B and 64C so that the clamp members 66A and 66B can pivot between the bearings 54 between the open and closed clamp positions without interference or obstruction from the connecting rods. The clamp assembly 56 allows the telescope tube 12 to be moved longitudinally along its central longitudinal axis 13 in the forward and rearward directions to achieve balance of the telescope tube 12 as different eyepieces or accessories with different weights are attached to the telescope tube. The clamp assembly 56 allows the telescope tube 12 to be rotated about its central longitudinal axis 13 so that the eyepiece may be conveniently located for the user. The telescope tube 12 is held by the clamp members 66A and 66B at at least two different locations along its length for greater rigidity and stability. The actuating mechanism 68 is operable to move the clamp members 66A and 66B between the closed and open clamp positions jointly or in conjunction via a single operating member 86 that is conveniently located. The operating member 86 may be operated by feel, and in the dark, to allow longitudinal and rotational adjustments of the telescope tube. The covers 82 enclose the pivots 78A and 78B and add thickness to the clamp members 66A and 66B where the pivots rotate. In this manner, the clamp members 66A and 66B are made thick enough by the covers 82 to enclose the pivots 78A and 78B. As the clamp members 66A and 66B rotate or pivot, the pivots 78A and 78B counter-rotate or counter-pivot in their covers to compensate and maintain the actuating member 80 aligned and level. A vertical slot 91 may be cut into each cover as shown in FIG. 9 to allow the actuating member 80 to pass through the bores 81 of the pivots 78A and 78B and keep them horizontal as the angle of the clamp members 66A and 66B is varied. The configuration of the apertures 71 in the open clamp position allows the entire telescope tube 12 to be slid out of the clamp assembly 56, if necessary, because the configuration of the apertures 71 in the open clamp position is large enough to allow the end ring 19 to fit therethrough. The clamp members 66A and 66B automatically center the telescope tube 12 when the clamp assembly 56 is in the closed clamp position. The clamp members 66A and 66B are self-equalizing in that if one clamp member clamps down on the telescope tube before the other it will remain stationary as the other clamp member tightens to the same degree.

Vertical or altitude adjustments of the telescope tube 12 as shown by arrow 92 in FIG. 1 are effected in response to vertical pushing or aiming forces on the telescope tube 12. This vertical pressure or force is transmitted through the clamp assembly 56 to the altitude bearings 54, causing the altitude bearings 54 to rotate on the tracks of the bearing holders 26. Vertical force or pressure on the telescope tube 12 is thusly converted to rotation of the altitude bearings 54 about the altitude rotation axis 65 to allow the imaging end 16 of the telescope tube 12 to be aimed at higher or lower elevations. Downwardly directed vertical forces are transmitted through the bearing holders 26 along the upper surfaces 36. Placing the clamp axles 69 in line with the forward and rearward outer ends of the upper surfaces 36 ensures that the forces transmitted from the telescope tube 12 to and through the clamp assembly 56 are transmitted directly to the platform 24 for greater strength, stiffness and stability. The triangular arrangement of the connecting rods 64A, 64B and 64C provides a strong, lightweight and rigid bearing structure ensuring that the bearings 54 are held parallel. The upper connecting rod 64A provides a handle at a centrally balanced point, allowing the altitude assembly 21 to be carried by one person holding the connecting rod 64A in the middle or two people lifting from the ends of the connecting rod 64A just inside the altitude bearings 54. The complementary arcuate configurations of the contact surfaces 60 of the bearings 54 and the upper surfaces 36 of the bearing holders 26 prevent the bearings 54 from sliding forwardly or rearwardly up and over the forward and rearward outer ends of the upper surfaces 36.

Horizontal or azimuth adjustments of the telescope tube 12 are effected in response to horizontal aiming or pushing forces on the telescope tube 12 as shown by arrow 93 in FIG. 2 so that the telescope tube 12 is rotated about the azimuth rotation axis 30 as shown by arrow 94 in FIG. 2. Horizontal force or pressure is transmitted from the telescope tube 12 through the clamp assembly 56 at the clamp axles 69 to the bearings 54. The bearings 54 push on the bearing holders 26, and the frictional adjustment mechanism or lip lock 46 transmits the azimuth force or pressure on the bearing holders 26 to the platform 24, which causes the platform 24 to rotate about the azimuth rotation axis 30. The lip lock 46 prevents the bearings 54 from slipping sideways off the tracks 52 when transmitting the twisting azimuth motion. Any sideways slippage between the contact surfaces 60 of the bearings 54 and the bearing surfaces or tracks 52 of the bearing holders 26 would result in an azimuth wobble when horizontal force or pressure on the telescope tube 12 is removed and the bearings 54 settle back on the tracks 52. The lip lock 46 prevents this type of wobble and ensures proper tracking of the bearings 54 on the tracks 52 when transmitting azimuth force or pressure. The lip lock 46 allows the frictional force between the frictional end surface 50 and the lip 62 of the bearing 54 to be adjusted so that just enough friction is applied to keep the bearings from twisting off track and causing an azimuth wobble. The lip 62 is structurally constrained against sideways movement along its outer surface by the frictional end surface 50 and along its inner surface by the outer surface of the bearing holder 26. Adjusting the friction of the lip lock 46 on the altitude bearing 54 alters the force needed to make altitude adjustments and, therefore, can be used to adjust the relationship of the force needed to change altitude position with the force needed to change azimuth position. Adjusting the lip lock 46 to place a small counter pressure on sideways movement of the bearings eliminates wobble. Balancing the operator forces needed to make altitude adjustments with the operator forces needed to make azimuth adjustments enables the telescope mount 14 to provide a smooth composite motion for the telescope tube 12 in any direction. The lip lock 46 allows adjustment of effort required to rotate the bearings 54 on the bearing holders 26 and facilitates balancing the effort required to move the telescope tube 12 simultaneously and smoothly in both altitude and azimuth directions. The lip lock 46 can be tightened sufficiently to lock the altitude bearings 54 in place, which is necessary when moving the telescope tube 12 longitudinally and/or rotationally within the clamp assembly 56. Locking the bearings 54 in place also safely locks the telescope when not in use or when carrying the entire telescope.

Figure 13:
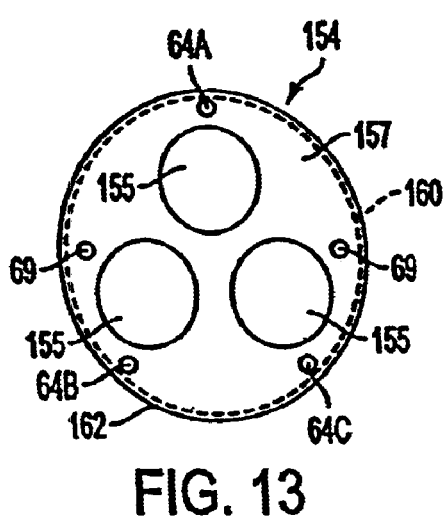
FIG. 13 depicts an alternative altitude bearing for the telescope mount.
Figure 14:
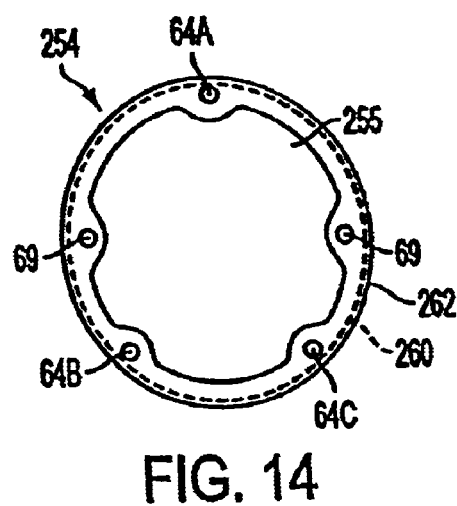
FIG. 14 depicts a further alternative altitude bearing for the telescope mount.

FIGS. 13 and 14 illustrate alternative altitude bearings 154 and 254 for use in the telescope mount of the present invention. Altitude bearing 154 shown in FIG. 13 has material removed from non-essential portions 155 thereof to reduce weight. The non-essential portions 155 for bearing 154 comprise three holes formed through the body 157. Material is removed from the bearing 154 at the non-essential structural portions 155 while essential portions including the contact surface 160, the lip 162, the locations for connecting rods 64A, 64B and 64C and the locations for axles 69 remain intact. Sufficient material is retained in bearing 154 to ensure sufficient structural connection between the essential portions.

FIG. 14 illustrates alternative bearing 254 having material removed from an irregularly shaped non-essential portion 255 while retaining essential portions including the contact surface 260, the lip 262, the locations for connecting rods 64A, 64B and 64C, and the locations for axles 69.

An alternative frictional adjustment mechanism or lip lock 346 is depicted in FIGS. 15 and 16 with an alternative bearing 354. The frictional adjustment mechanism or lip lock 346 is representative of a frictional adjustment mechanism or lip lock in which the extension element 348 does not extend through the buttress 38. The lip lock 346 comprises an angled bracket 347 attached to the buttress 38 and/or bearing holder 26 and having a shoulder 345 spaced from the outer surface of the bearing holder 26 to define a slot between an inner surface of the shoulder 345 and the outer surface of the bearing holder 26. The shoulder 345 has a threaded passage therethrough perpendicular to the bearing holder outer surface and threadedly receiving extension element 348 having knob 349 at one end and frictional end surface 350 at an opposite end. The extension element 348 is rotatable via the knob 349 to selectively extend and retract the frictional end surface 350 in the slot. The slot receives the lip 362 of altitude bearing 354 having its contact surface 360 supported on the track 52 of bearing holder 26 as described above. The bearing 354 is similar to bearing 54 except that lip 362 differs from lip 62 in that lip 362 has its inner surface angled from the contact surface 360 in the direction of the lip outer surface. Accordingly, the inner surface of lip 362 is non-parallel to its outer surface and is angled away from the outer surface of bearing holder 26 to minimize friction between the lip 362 and the bearing holder 26. The lip 62 has parallel outer and inner surfaces with the inner surface of lip 62 parallel to the outer surface of the bearing holder.

Figure 17:
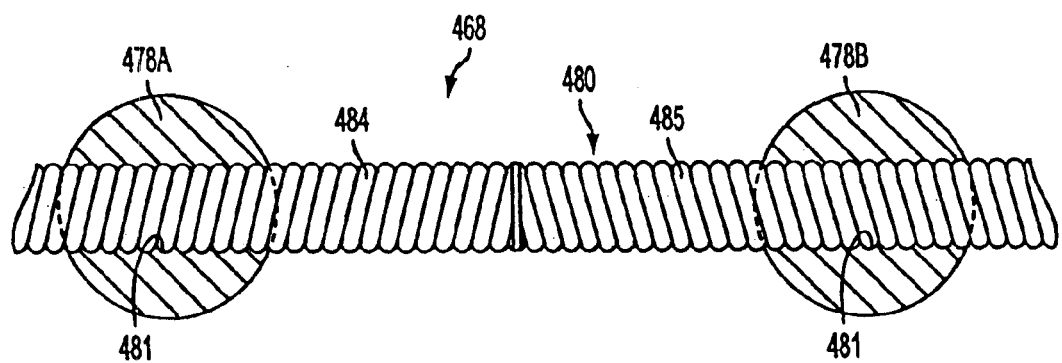
FIG. 17 is a broken side view, partly in section, depicting an alternative actuating mechanism for the clamp assembly.

An alternative actuating mechanism for the clamp assembly of the present invention is depicted at 468 in FIG. 17. Actuating mechanism 468 comprises forward pivot 478A mounted in a cover on a forward clamp member and a rearward pivot 478B mounted in a cover on a rearward clamp member as described above for pivots 78A and 78B. The pivots 478A and 478B are connected by an actuating member 480 comprising a shaft having an externally threaded forward portion 484 with a thread extending thereon in a first direction and an externally threaded rearward portion 485 having a thread extending thereon in a second direction opposite the first direction. The forward portion 484 may have a left-hand thread extending thereon while the rearward portion 485 may have a right-hand thread extending thereon. The forward portion 484 turns within the forward pivot 478A, the bore 481 of which is internally threaded with a left-hand thread. The rearward portion 485 turns within the rearward pivot 478A, the bore 481 of which has an internal right-hand thread. The actuating member 480 imparts screw action at both pivots 478A and 478B so that the clamp members of the clamp assembly can be adjusted twice as fast and far per each turn of the operating member used to rotate the actuating member.

Figure 18:
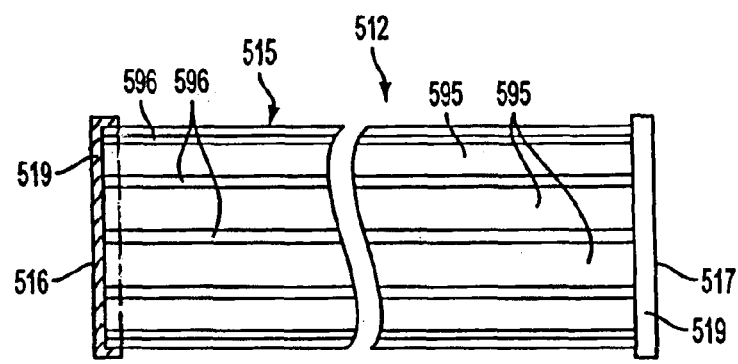
FIG. 18 is a broken side view, partly in section, of a telescope tube according to the present invention.
Figure 19:
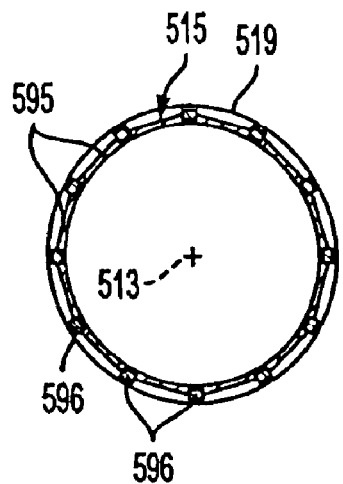
FIG. 19 is an end sectional view of the telescope tube.
Figure 20:
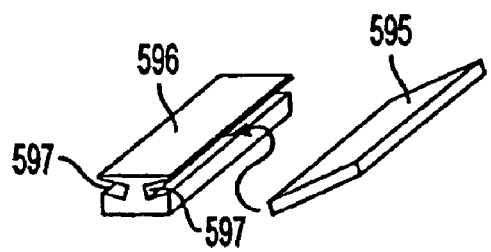
FIG. 20 is a broken, partial, exploded perspective view of the body of the telescope tube.
Figure 21:
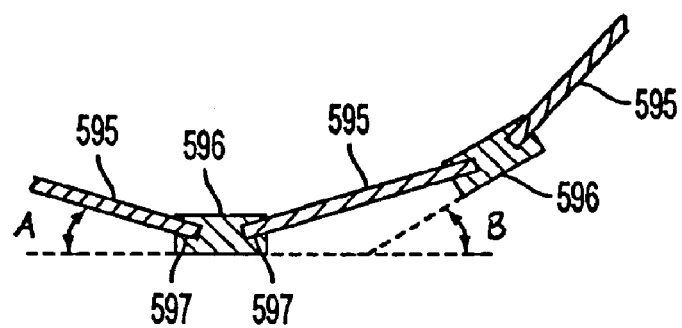
FIG. 21 is a broken sectional view of the body of the telescope tube.

A telescope tube 512 according to the present invention is illustrated in FIG. 18, and the telescope tube 512 may advantageously be used with the telescope mount 14 to form a telescope 10. The telescope tube 512 comprises body 515 constructed of wood and end rings 519 at the forward and rearward ends 516 and 517 of body 515. The body 515 contains optics for providing a magnified image of an object at which the forward or imaging end is pointed. An eyepiece (not shown) may be provided at or near the rearward or viewing end 517 for viewing the magnified image. As shown in FIGS. 19–21, body 515 comprises a plurality, preferably twelve, planar longitudinally extending slats 595 interconnected along their longitudinal sides by a like plurality of planar longitudinally extending ribs 596. Each slat 595 has a planar internal surface facing the central longitudinal axis 513 of the telescope tube 512, a planar external surface opposite and parallel the internal surface, and parallel sides connecting the external and internal surfaces. Each rib 596 has a planar interior surface facing the central longitudinal axis 513, a planar exterior surface opposite and parallel the interior surface, parallel sides connecting the exterior and interior surfaces, and angled slots 597 extending continuously along the sides of the rib. The interior surface of each rib is connected to its sides at inner corners. The exterior surface of each rib is connected to its sides at outer corners. The slots 597 for each rib 596 are oppositely angled and are open along the sides of the rib. The slots 597 for each rib 596 are disposed at an angle A of 15° with the exterior surface of the rib, and the slots 597 are open at or adjacent the inner corners of the rib to minimize protrusions along the interior of the telescope tube 512. The slots 597 of each rib 596 extend angularly inwardly toward one another at the same angle from the slot openings adjacent the inner corners, respectively. The slats 595 have a thickness between their external and internal surfaces and a width between their sides, with each slat having the same thickness and width. The ribs 596 have a thickness between their exterior and interior surfaces and a width between their sides, with each rib having the same thickness and width. The ribs 596 are of greater thickness than the slats 595. The longitudinal sides of the slats 595 are inserted in the slots 597, which are deep enough to retain the longitudinal sides of the slats in the ribs. Accordingly, each rib 596 retains the longitudinal sides of two adjacent slats 595 defining an angle A of 15° with the exterior surface of the rib. When thusly assembled, the exterior surfaces of adjacent ribs 596 are disposed in planes which intersect at an angle B of 30° as shown in FIG. 21. The end rings 519 have an external diameter greater than the external diameter of the circle or cylinder approximated by the body 515.

The telescope tube 512 incorporates the advantages of wood with its relatively high strength to weight ratio and low specific heat while utilizing two simple structural parts in plurality. No reinforcing rings or bulkheads are need so that the interior of the tube is unobstructed thereby allowing for the free flow of air currents. The exterior of the body 515 is sufficiently circular or cylindrical to allow rotation of the telescope tube within the clamp assembly. The ribs 596 present protrusions along the exterior of the body 515 to facilitate gripping of the telescope tube for positional adjustments. The protrusions presented by ribs 596 along the exterior act as hand holds or hand grips running essentially the entire length of the telescope tube so that the force required to aim the imaging end of the telescope tube can be applied at any point along the length of the telescope tube. Accordingly, leverage changes are facilitated making it easier to equalize the effort to make altitude and azimuth adjustments. Sliding the hands up and down the length of the telescope tube 512 to vary the force needed to aim the imaging end is intuitive. Stresses on the exterior of the body 515 are distributed by the ribs 596 circumferentially around the tube as well as along its length, thereby imparting strength and stiffness in a lightweight package.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A telescope comprising
an elongate telescope tube having a central longitudinal axis;

a mount supporting said telescope tube for altitude and azimuth positioning, said mount comprising an azimuth assembly and an altitude assembly supported on said azimuth assembly, said azimuth assembly comprising a horizontal platform rotatable about a vertical azimuth rotation axis, a pair of vertical bearing holders supported on said platform in parallel spaced relation, said altitude assembly comprising a pair of vertical bearings interconnected in parallel spaced relation, said bearings being supported on said bearing holders for rotation about an altitude rotation axis perpendicular to said azimuth rotation axis; and a clamp assembly disposed between said bearings and comprising a plurality of longitudinally spaced clamp members selectively pivotal between open and closed clamp positions and an actuating mechanism for pivoting said clamp members between said open and closed clamp positions, each of said clamp members having an aperture through which said telescope tube extends, said telescope tube being movable longitudinally along said central longitudinal axis and being rotatable about said central longitudinal axis within said apertures when said clamp members are in said open clamp position, said telescope tube being prevented from moving longitudinally along said central longitudinal axis and being prevented from rotation about said central longitudinal axis within said apertures when said clamp members are in said closed clamp position, said actuating mechanism including an actuating member interconnecting said clamp members for pivotal movement between said open and closed clamp positions and an operating member for operating said actuating member to move said clamp members between said open and close clamp positions.

2. The telescope recited in claim 1 wherein said plurality of clamp members comprises a forward clamp member and a rearward clamp member pivotal in opposition to one another, each of said clamp members being pivotal about a pivot axis parallel to said altitude rotation axis and perpendicular to said central longitudinal axis of said telescope tube, said clamp members being pivotally connected to said bearings along said pivot axes, respectively.

3. The telescope tube recited in claim 2 wherein said clamp members are perpendicular to said central longitudinal axis with said apertures presenting a modified elliptical configuration perpendicular to said central longitudinal axis in said open clamp position, said clamp members being non-perpendicular to said central longitudinal axis with said apertures presenting a modified circular configuration perpendicular to said central longitudinal axis in said closed clamp position.

4. The telescope recited in claim 2 wherein said actuating mechanism includes a forward pivot mounted to an upper end of said forward clamp member and a rearward pivot mounted to an upper end of said rearward clamp member, and said actuating member includes a selectively rotatable shaft connecting said pivots for moving said upper ends toward one another to pivot said clamp members from said open clamp position to said closed clamp position and moving said upper ends away from one another to pivot said clamp members from said closed clamp position to said open clamp position in response to rotation of said shaft.

5. The telescope recited in claim 4 wherein said altitude assembly further includes a plurality of connecting rods extending perpendicularly between said bearings, said connecting rods being arranged as a triangle with an upper one of said connecting rods disposed above said telescope tube and two lower ones of said connecting rods disposed below said telescope tube, said lower connecting rods being disposed between said pivot axles.

6. The telescope recited in claim 4 wherein said operating members includes a handle for rotating said shaft to effect operation of said actuating member.

* * * * *